United States Patent
Henn et al.

(10) Patent No.: US 7,077,103 B2
(45) Date of Patent: Jul. 18, 2006

(54) METHOD FOR REGULATING THE FILLING OF AN INTERNAL COMBUSTION ENGINE

(75) Inventors: Michael Henn, Lehre (DE); Hong Zhang, Tegernheim (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/523,336

(22) PCT Filed: Jul. 14, 2003

(86) PCT No.: PCT/DE03/02365

§ 371 (c)(1),
(2), (4) Date: Jan. 28, 2005

(87) PCT Pub. No.: WO2004/016925

PCT Pub. Date: Feb. 26, 2004

(65) Prior Publication Data

US 2006/0042591 A1 Mar. 2, 2006

(30) Foreign Application Priority Data

Jul. 30, 2002 (DE) .................... 102 34 719

(51) Int. Cl.
*F02D 9/02* (2006.01)
*F02D 11/10* (2006.01)
*F02D 13/02* (2006.01)
*F02D 41/04* (2006.01)
*F01L 9/04* (2006.01)

(52) U.S. Cl. ............ 123/399; 123/403; 123/348; 123/90.11

(58) Field of Classification Search ........... 123/90.11, 123/90.15, 336, 337, 342, 347, 348, 361, 123/399, 403, 442; 701/102, 103, 110
See application file for complete search history.

(56) References Cited

U.S. PATENT DOCUMENTS

| | | | | |
|---|---|---|---|---|
| 4,528,958 A | * | 7/1985 | Yoshida et al. | 123/442 |
| 5,168,954 A | * | 12/1992 | Nakaniwa et al. | 701/102 |
| 5,220,828 A | * | 6/1993 | Sodeno et al. | 123/442 |
| 5,596,957 A | * | 1/1997 | Ichinose et al. | 123/336 |
| 5,632,249 A | * | 5/1997 | Sadakane et al. | 123/442 |
| 6,874,467 B1 | * | 4/2005 | Hunt et al. | 123/399 |

FOREIGN PATENT DOCUMENTS

DE 197 33 106 A1 2/1999

(Continued)

*Primary Examiner*—Willis R. Wolfe, Jr.

(57) ABSTRACT

Disclosed is a method for regulating the filling of an internal combustion engine to which a combustion air mass flow is fed. Said combustion air mass flow is regulated by a first and a second actuator which are triggered regarding the position thereof. The second actuator is disposed downstream of the first actuator within the air mass flow and has a final upper position in which said actuator is open to the maximum and a final lower position in which the second actuator is closed to the maximum. The actual rotation speed of the internal combustion engine is detected while a set point intake pipe pressure is predefined for triggering the first actuator. The set point intake pipe pressure is determined by means of an rpm-related characteristic map in which the set point air mass flow is not taken into account as long as the second actuator is not located in the final lower position. The set point intake pipe pressure is limited to a minimum value of the intake pipe pressure, which can be obtained in the current set point air mass flow by means of the second actuator that is placed in the final upper position.

11 Claims, 3 Drawing Sheets

FOREIGN PATENT DOCUMENTS

| | | |
|---|---|---|
| DE | 199 28 560 A1 | 12/2000 |
| DE | 199 53 933 C1 | 2/2001 |
| EP | 0 820 559 B1 | 1/1998 |
| EP | 1 063 393 A2 | 12/2000 |
| EP | 1 104 843 A2 | 6/2001 |
| WO | WO 01/40642 A1 | 6/2001 |

* cited by examiner

METHOD FOR REGULATING THE FILLING OF AN INTERNAL COMBUSTION ENGINE

CROSS REFERENCE TO RELATED APPLICATION

This application is the US National Stage of International Application No. PCT/DE2003/002365, filed Jul. 14, 2003 and claims the benefit thereof. The International Application claims the benefits of German Patent application No. 10234719.0 DE filed Jul. 30, 2002, both of the applications are incorporated by reference herein in their entirety.

FIELD OF THE INVENTION

The invention relates to a method for regulating the charge of an internal combustion engine, to the combustion chambers of which is fed a combustion air mass flow that is regulated to a setpoint air mass flow by a first and a second actuator which are controlled with respect to their position, the second actuator being arranged downstream of the first actuator within the air mass flow and having an upper limit position in which it is open to the maximum and a lower limit position in which it is closed to the maximum, the actual rotational speed of the internal combustion engine being detected, and a setpoint intake pipe pressure being predefined for controlling the first actuator.

BACKGROUND OF THE INVENTION

In particular in internal combustion engines where the mixture is formed externally, it is known to regulate the combustion air mass flow and hence the charge in the combustion chambers of the internal combustion engine via an actuator provided in the intake tract. Usually this actuator is designed as a throttle plate which can be used to close off the cross-section of the intake tract. The position of the throttle plate then has a direct effect on the charge. If the throttle plate is not fully open, then the air sucked in by the internal combustion engine is throttled and hence the torque output by the internal combustion engine is reduced. This throttle action depends on the position and hence the aperture cross-section of the throttle plate. When the throttle plate is fully open, the maximum torque is output by the internal combustion engine.

To achieve optimum regulation of the throttle plate, the throttle plate is actuated by a positioner having positional feedback; a control device is provided here that calculates the necessary aperture of the throttle plate, taking into account the current operating status of the internal combustion engine, and controls the throttle plate positioner. An accelerator pedal position is evaluated via a pedal transducer for this purpose.

In order to keep the losses occurring at the throttle plate as low as possible, it is known to be able to operate inlet valves of an internal combustion engine with variable valve travel. The inlet valves then open with an adjustable travel path so that, at least in some operating phases of the internal combustion engine, there is no need to actuate the throttle plate. The charge of the internal combustion engine is then regulated exclusively via the adjustment of the valve travel.

In order to achieve both minimum possible consumption and a transition that is as unnoticeable and hence as comfortable as possible between fully unthrottled operation, i.e. operation of the internal combustion engine with charge regulation involving valve travel adjustment, and conventional throttled operation, the aim is for as smooth a transition as possible with overlapping interaction of valve travel regulation and throttle plate regulation.

In this context, a method of the type cited in the introduction is known from DE 199 28 560 A1, wherein a setpoint intake pipe pressure is regulated for the intake pipe by regulating the throttle plate, and the air mass flow is controlled by means of suitable operation of the valve travel adjustment. The generic method involves creating a combination and a transition function of two different torque control systems that can work in all operating conditions. The generic document distinguishes between three operating phases here. In one phase, the air mass flow is regulated exclusively via the valve travel adjustment at a constant pressure setting. In another phase, when the inlet valves are set at maximum valve travel, a further increase in charge is achieved by controlling the throttle plate. In a transition region between these two control processes, throttle plate and valve travel adjustment are controlled in opposition. It is assumed here that the necessary dependencies between valve travel adjustment and pressure differential are known and can be saved in an electronic control unit.

The method described in DE 199 28 560 A1 requires a relatively large amount of memory space, because extensive data records need to be saved for these dependencies and used during the control process in order to implement operation in the transition region.

SUMMARY OF THE INVENTION

It is therefore the object of the invention to improve a generic method with regard to the extent of memory used, and hence to simplify the execution of the method.

This object is achieved by a method of the type cited in the introduction in that as long as the second actuator is not in the lower limit position, the setpoint intake pipe pressure is determined by means of a rotational speed dependent characteristic map for which the setpoint air mass flow is not an input parameter, the setpoint intake pipe pressure being limited to an intake pipe pressure minimum value that can be achieved for the current setpoint air mass flow with second actuator set in the upper limit position.

According to the invention, the setpoint intake pipe pressure is determined by referring to a characteristic map that does not depend on the setpoint air mass flow, and closer coupling of the two actuators does not occur until the second actuator reaches the upper limit position. This approach not only enables a sharp reduction in the extent of memory and data processing used in the execution of the method for regulating the charge, in particular it is no longer necessary to save a dependency in detail in the form of large amounts of data, but also enables a better control result because the two actuators are controlled independently as long as the setpoint intake pipe pressure originates from the characteristic map, i.e. the second actuator is not in a limit position.

Furthermore, it is possible to use an invertible model for determining the setpoint intake pipe pressures at the limit positions of the second actuator, said model not only saving processing time and memory space requirement, but also in its inverse form can be incorporated in the control process at another point when a link between air mass flow, intake pressure and the position of the second actuator is required. This is the case, for instance, when calculating the setpoint position of the second actuator, which, in a development of the method according to the invention that can be executed particularly economically in terms of processing, is determined from the setpoint air mass flow and the actual intake pipe pressure by an inversion of the mass flow model.

It is particularly easy to make the model invertible if the mass flow model has a monotonic characteristic curve that links the position of the second actuator, the air mass flow and the intake pipe pressure. The inversion of the model then involves a simple inversion of the characteristic curve, which owing to the monotonicity of the characteristic curve can be implemented easily and produces unique results.

A model can also be used for controlling the first actuator that converts the setpoint air mass flow and the setpoint intake pipe pressure into a setpoint position of the first actuator. The use of such a model results in the setpoint position of the first actuator being obtained particularly precisely and economically in terms of processing.

By using a generation procedure for the setpoint intake pipe pressure that is not affected by the air mass flow for situations in which the second actuator is not in its limit position, smooth transitions are achieved between areas in which the charge regulation is effected by the appropriate actuation of the second actuator, and areas in which the charge is regulated via the throttle plate. This results in a simple controller structure with which a good match with an internal combustion engine model can be achieved using just a few parameters. This is particularly true, because models are already being used for calculating the charge in internal combustion engines that have just one first actuator but no second actuator. The approach according to the invention enables all possible operating modes to be covered, from severely throttled to full load.

In operating situations in which the second actuator is lying in the lower limit position, i.e. the second actuator can no longer have any further effect on the charge in the combustion chambers of the internal combustion engine, an additional intervention via the first actuator to adjust the air mass is unavoidable because then the setpoint intake pipe pressure is set by the limit positions and simultaneously becomes dependent on the air mass flow. A development of the invention is therefore preferred in which, when the second actuator is positioned in the lower limit position, the setpoint intake pipe pressure is determined without the model according to the invention, and the first actuator is actuated in order to adjust the setpoint air mass flow.

A throttle plate for the first actuator and a device for adjusting the travel path of inlet valves for a second actuator are suitable as actuators in an internal combustion engine in particular. It is therefore preferred that a throttle plate located in an intake tract is used as the first actuator, and inlet valves with variable travel adjustment are used as the second actuator. Of course, any other actuators can be used, for example electro-magnetically operated valves, which are an example of inlet valves in which not the maximum travel but the opening period can be adjusted. As an alternative to a throttle plate, the first actuator may also involve the control of a suitable charging device, for example a turbocharger having variable geometry, or a compressor.

Nowadays internal combustion engines are used very frequently in motor vehicles. For such an application, it is preferred that the setpoint air mass flow is derived from a driver request signal.

The method according to the invention can be applied to any internal combustion engine having two actuators in the intake tract which, connected in series, each affect the air mass flow through the intake tract. Usually this will involve a throttle plate and a valve travel adjustment that can be used to affect the behavior of the inlet valves during opening. In this case, adjustment of the inlet valve control periods is just as conceivable as adjustment of the maximum travel that the inlet valves can perform during the opening. Also in this case, only discreetly adjustable inlet valves are suitable for the method according to the invention, for example inlet valves that can be adjusted between two different maximum travels.

The method according to the invention creates the basis for independent controls of the two actuators, e.g. a throttle plate and a valve travel adjustment. This can be used to achieve a smooth transition between un-throttled operation, in which for example the air mass flow of the combustion air is only controlled via the valve travel adjustment, and conventional throttled operation in which inlet valves are operated with fixed maximum valve travel and the charge is regulated via a throttle plate.

BRIEF DESCRIPTION OF THE DRAWINGS

The invention is explained in further detail below with reference to the drawing by way of example. In the drawings.

DETAILED DESCRIPTION OF THE INVENTION

Figure 1:
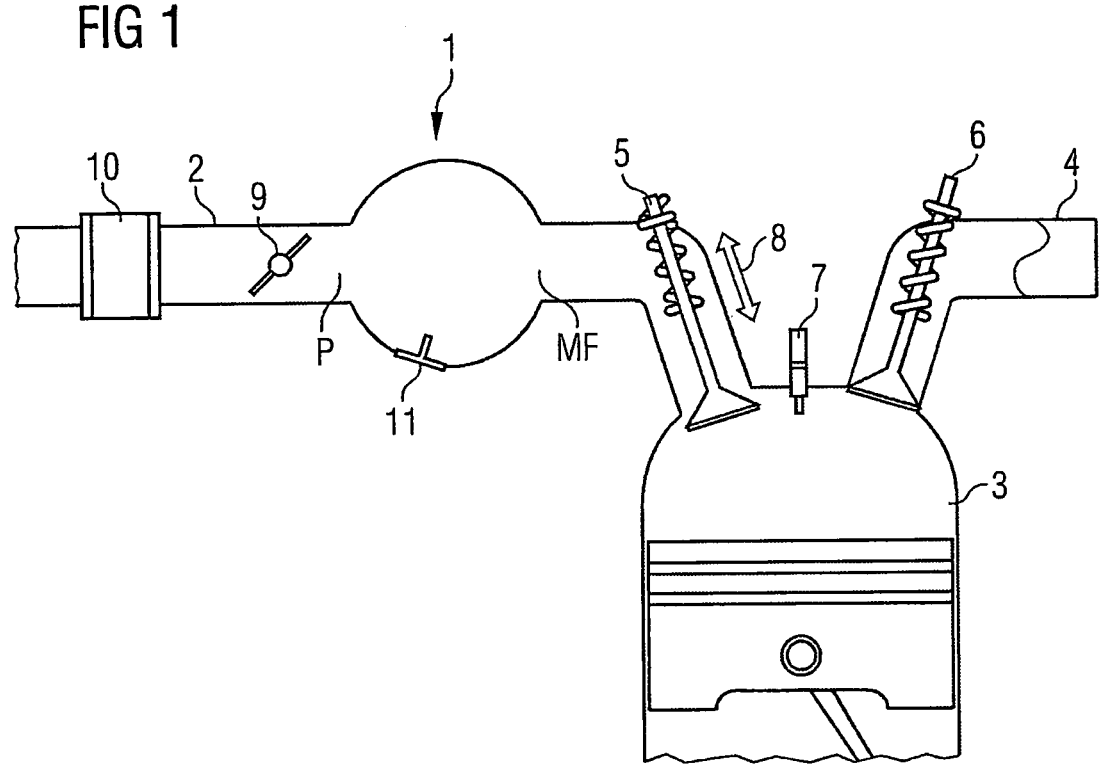
FIG. 1 shows a schematic diagram of an intake tract of a gasoline internal combustion engine.

The intake side of the internal combustion engine 1 is shown schematically in FIG. 1. It has an intake pipe 2 via which combustion air reaches the combustion chambers of the internal combustion engine 1. A combustion chamber 3 is shown schematically in FIG. 1. Exhaust gases from the combustion flow into an exhaust tract 4. The combustion chamber 3 is closed off from the intake pipe 2 via an inlet valve 5, and from the exhaust tract 4 via an outlet valve 6. In addition, a spark plug 7 projects into the combustion chamber that ignites the compressed mixture that has been sucked in.

The travel of the inlet valve 5 can be adjusted via a valve travel adjustment unit 8, indicated schematically in FIG. 1 by a double arrow. Here the inlet valve 5, which is operated via a camshaft drive (not shown), performs a maximum travel that differs in extent, lying between a minimum and a maximum valve travel value, depending on the setting of the valve travel adjustment unit 8. For the sake of simplicity, the term "valve travel" is merely used to mean the maximum rise of the inlet valve 5 during an opening process. The valve travel is detected by a valve travel sensor (not shown in FIG. 1).

A throttle plate 9 is also located in the intake pipe 2, said throttle plate being operated by a positioner having positional feedback. A throttle plate sensor (not shown in FIG. 1) is provided for the positional feedback and supplies a measured value for the opening angle of the throttle plate, i.e. for the throttle plate position.

Positioned near the inlet to the intake pipe 2 upstream of the throttle plate 9 in the flow direction is an air mass flow sensor 10 that detects the air mass flow MF flowing into the intake pipe 2. Such an air mass flow sensor 10 is known for air mass-controlled control systems of internal combustion engines.

In addition, there is a pressure sensor 11 between the throttle plate 9 and the inlet valve 5 that measures there the pressure in the intake pipe 2. Such a measurement of the intake pipe pressure P is known for intake pipe pressure controlled charge regulation systems.

Figure 2:
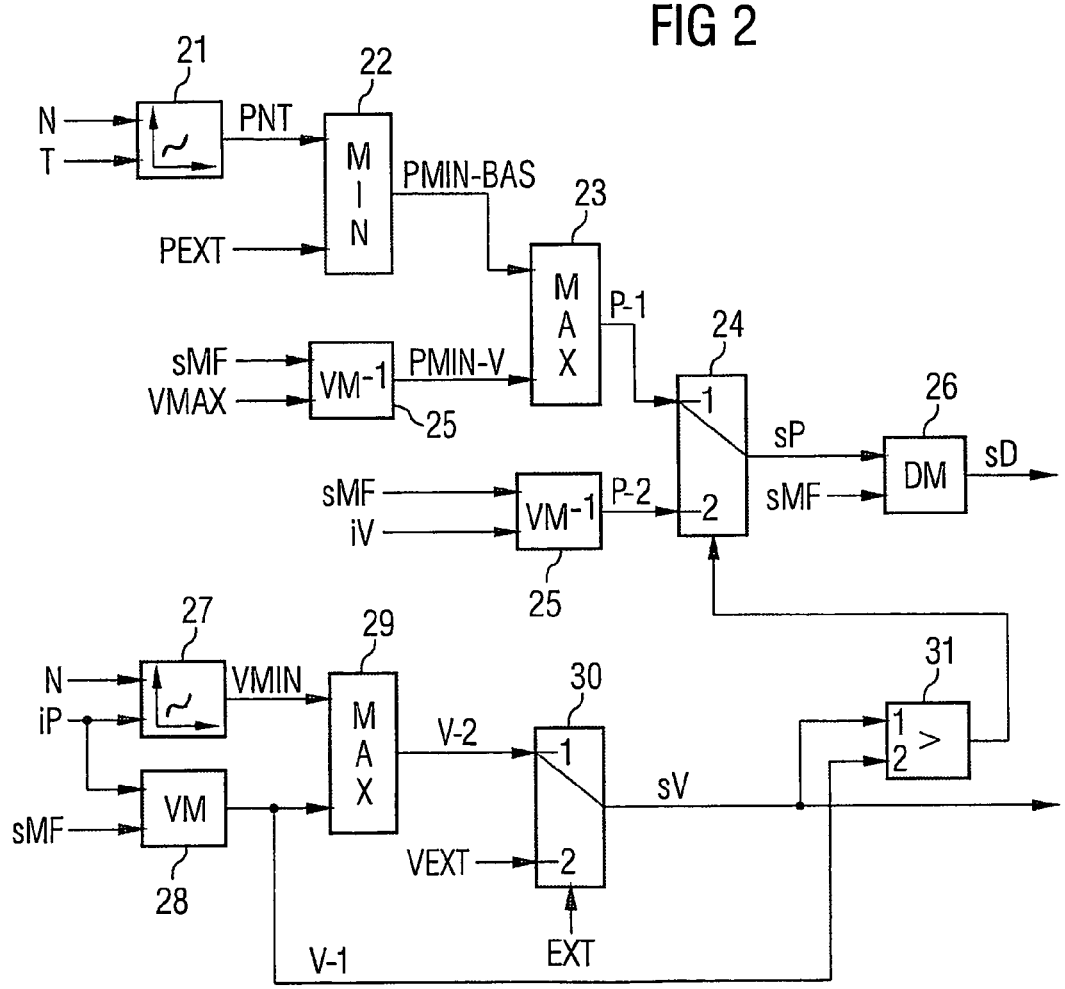
FIG. 2 shows a block diagram for determining setpoint values for throttle plate position and valve travel in an internal combustion engine.

FIG. 2 shows in a block diagram individual functions running during the execution of a method for regulating the charge, where individual processing blocks are drawn in, together with the variables transmitted between them. Setpoint variables are prefixed with an "s", modeled variables with an "m" and actual variables with an "i" to help to distinguish between them.

The method is here executed by a control device 12, to which are input various measured values for operating parameters of the internal combustion engine 1. At the internal combustion engine 1, the actual value of the air mass flow MF is detected via the air mass flow sensor 10. The pressure sensor 11 measures the actual value of the intake pipe pressure P. The valve travel sensor 13 detects the actual value of the valve travel V, a rotational speed sensor measures the rotational speed N and the throttle plate sensor 15 outputs at its output the actual value of the throttle plate position D. The actual values for valve travel iV, throttle plate position iD, suction pipe pressure iP and rotational speed N are read by the control device 12.

During operation, the control device 12 continuously determines setpoint values for the throttle plate position sD and the valve travel sV, which it does by applying a scheme that is shown as a block diagram in FIG. 2. This scheme essentially has two branches, as can be seen easily in FIG. 2: one for determining the setpoint value of the throttle plate position sD (shown in the top part of FIG. 2) and one for determining the setpoint value for the valve travel sV (shown in the lower part of FIG. 2). The two branches are linked together, however, via cross-connections that will be explained later.

The setpoint intake pipe pressure sP is the target variable for determining the setpoint throttle plate position sD. In order to calculate this value, first a base pressure PNT that is meant to exist in the intake pipe for the given operating point (based on the rotational speed N and temperature T) is found in a characteristic map 21 from rotational speed N and temperature of the intake air T. This value, together with a pressure request PEXT that originates from external functions, e.g. a tank ventilation system, are input to a minimum selection unit 22, which outputs at the output the smaller of the values input to the input, so that a value for an intake pipe pressure base value PMIN-BAS is present at the output. This base value, together with a lower pressure value PMIN-V, is input to a maximum selection unit 23, which switches through to the output the larger of the two values, so that an intake pipe pressure intermediate value P-1 is present at the output.

The lower pressure value PMIN-V is the intake pipe pressure that is obtained for maximum valve travel V at the operating point required by the setpoint air mass flow. The value originates from a mass flow model 25, to which were input the setpoint value for the air mass flow sMF and a value for the maximum valve travel VMAX. This model will be described in more detail later.

The setpoint intermediate value P-1 is input to a switch 24 which receives at another input an additional intake pipe pressure intermediate value P-2. This additional intermediate value P-2 also originates from the mass flow model 25, which similarly received at the one input the setpoint value for the air mass flow sMF. At the other input, the actual value for the valve travel iV is input to the mass flow model 25 to calculate the additional intermediate value P-2. As will be shown in the later description, this is actually the valve travel at the upper limit position.

The switch 24 switches one of the two inputs through to the output, the switch position (position "1" or position "2") depending on a control signal whose origin will be explained later. At this point one merely needs to know that the switch is in position "1" when the valve travel is not at the lower limit position value. In this case the additional intermediate value P-2 is hence output at the output as setpoint value for the intake pipe pressure sP. A setpoint value for the throttle plate position sD is then found in a throttle plate model 26 from this output and the setpoint value for the air mass flow sMF. This model is explained later.

In the branch for determining the setpoint value for the valve travel sV, first a value for a minimum valve travel VMIN is determined in a characteristic map 27 from the rotational speed N and the actual value for the intake pipe pressure iP, said valve travel being the value that can be set as a minimum for the valve travel for the current operating point.

In parallel with this, a valve travel intermediate value V-1 is determined from the actual value for the intake pipe pressure iP and the setpoint value for the air mass flow sMF in an inverted mass flow model 28, where the inverted mass flow model 28 being used is the exact inverse of the mass flow model 25 that is used in the upper branch of the block diagram of FIG. 2 for determining the setpoint value for the intake pipe pressure sP.

The valve travel intermediate value V-1 and the setpoint value for the minimum valve travel VMIN are evaluated in a maximum selection unit 29 so that the larger of the two values is output at the output as a valve travel intermediate value V-2.

This is then applied to an input "1" of a switch 30, to whose input "2" an external valve travel value VEXT is input. The position of the switch 30 depends on an external control signal EXT. This control signal EXT is used to switch to the input "2" when it is imperative to preset a specific valve travel VEXT, for example when the internal combustion engine is starting up, during fault conditions, during adaptation runs and so on. In normal operation, the control signal EXT causes the switch 30 to sit in the position "1", so that the setpoint value for the valve travel sV output at the output is identical to the valve travel intermediate value V-2.

The setpoint value for the valve travel sV determined in this way is input to a comparative unit 31 that also receives at the input the valve travel intermediate value V-1. If the two values are equal, i.e. the setpoint value for the valve travel sV ultimately originates from the inverted mass flow model 28, then the comparative unit 31 outputs at its output a signal that switches the switch 24 of the upper branch of the block diagram of FIG. 2 into the position "1". If the values are not equal, i.e. the setpoint value for the valve travel sV resulted from the external valve travel value VEXT or from the minimum valve travel value VMIN, then the switch 24 sits in position "2".

Hence for switch position "2", the mass flow model 25 actually uses the limit position as the actual position iV, namely the current minimum valve travel value VMIN (or the external value VEXT).

The output of the comparative unit 31 does not represent the only link from the upper to the lower branch of the block diagram of FIG. 2. Further links exist; one link exists by virtue of the fact that the valve travel intermediate value V-1 is calculated using an inverted mass flow model 28 that is also incorporated in the calculation of the intake pipe pressure intermediate value P-2, albeit in the original non-inverted form. Another link exists by virtue of the fact that both the upper and the lower branch process the setpoint value for the air mass flow sMF. The same applies to the rotational speed N.

Finally, there is another link in the control circuit owing to the fact that the upper branch of the block circuit diagram of FIG. 2 determines the setpoint value for the intake pipe pressure sP, and the lower branch incorporates the actual value for the suction pipe pressure iP.

Figure 3:
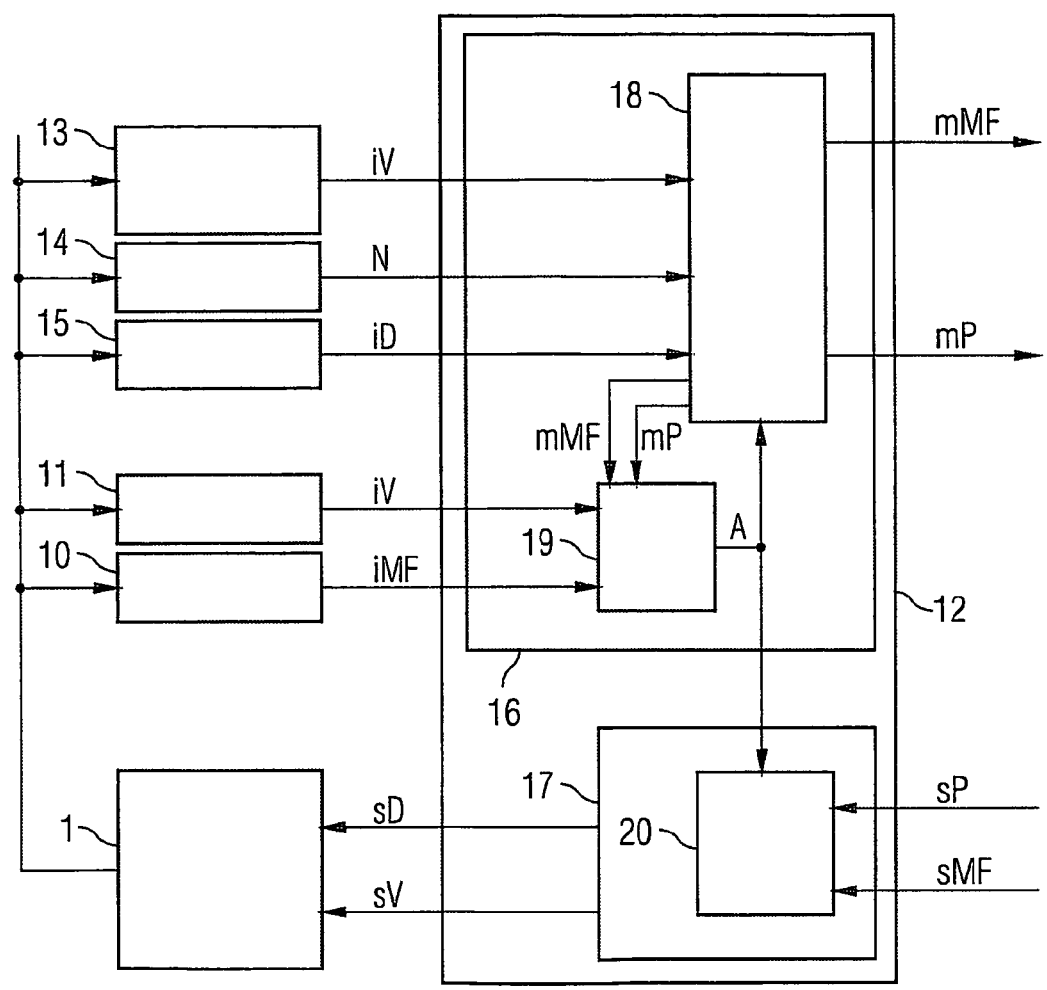
FIG. 3 shows the associated control structure for a method for regulating the charge in a gasoline internal combustion engine.

This control engineering link is shown in more detail in FIG. 3, which shows the controller structure as a block diagram. In this structure, the control device 12 has a feedforward block 16 and a feedback block 17. Model values for air mass flow MF and suction pipe pressure P are determined in the feedforward block 16. The feedforward block 16 has a model unit 18 and a comparison module 19, whose function is explained later.

The model unit 18 receives the actual values for valve travel iV and throttle plate position D, and the measured value of the rotational speed N, and calculates as a function of these input variables model values for the intake pipe pressure mP and the air mass flow mMF. Here additional influencing variables such as temperature in the suction pipe 2 can be taken into account. The model is based on equation 1 below $$mMF = C \times Q \times LD \times PSI, \quad \text{(Equation 1)}$$

in which C is a temperature-dependent constant, Q is a cross-section function of the throttle plate, LD is the ambient air pressure and PSI is a psi function. The constant C represents the temperature influences on the gas flow, and can either be taken from a suitable characteristic map or calculated using equation 2 below from the gas constant G, the air temperature T and the isotropic exponent K of the gas (1.4 for air):

$$C = \sqrt{\frac{2K}{(K-1)} \frac{1}{GT}} \quad \text{(Equation 2)}$$

The cross-section function Q defines the flow cross-section left open by the throttle plate 9 as a function of the throttle plate position D, and is determined by referring to a suitable characteristic map. The psi function PSI represents a value as a function of the pressure gradient across the throttle plate, i.e. of the quotient of intake pipe pressure P and air pressure LD; it is known in the field by the person skilled in the art.

The modeled air mass flow mMF calculated in this way is output by the model unit 18 to the comparison module 19 among others.

In order to calculate the modeled intake pipe pressure mP, the model unit 18 establishes a balancing of the mass flows in the intake pipe according to equation 3 below $$mP = \frac{G \cdot T}{VOL} \int (MF - MZ) dt \quad \text{(Equation 3)}$$

where VOL is the intake pipe volume between throttle plate and inlet valve, and MZ is the air mass flow in the cylinder. The air mass flow in the cylinder can be calculated from equation 4 below $$MZ = VF \cdot (F1 \cdot mp - F2) \quad \text{(Equation 4)}$$

where VF represents a valve travel function, i.e. describes the influence of the valve travel V on the air mass flow MF flowing into the cylinder. The factors F1 and F2 are volume efficiencies that depend on the rotational speed and operating parameters, where F1 is the gradient of an efficiency curve and F2 the zero value of this curve (offset).

The two equations 3 and 4 yield a differential equation from which the modeled intake pipe pressure mP can be calculated as a function of the air mass flow MF and the parameters that influence the valve travel function VF and the factors F1 and F2. This is therefore the mass flow model that was mentioned with reference to FIG. 2.

By solving this differential equation, as is described for example in EP 0 820 559 B1, the model unit 18 determines the modeled intake pipe pressure mP and outputs this to the comparison module 19.

The comparison module 19 then calculates comparison parameter A from the difference between modeled and actual variables for intake pipe pressure P and air mass flow MF and applies this to both the model unit 18 and an inverse model unit 20 provided in the feedback block 17. A feedback control circuit is thereby connected between comparison unit 19 and model unit 18 that corrects differences between modeled air mass flow mMF and actual air mass flow iMF by making changes to the cross-section function Q and the value used for the ambient air pressure LD, i.e. the air pressure before the throttle. The same applies to the solution of the differential equation, which then already incorporates the improved modeled air mass flow mMF. The comparison model 19 uses for this purpose the actual values for intake pipe pressure iP and air mass flow iMF supplied by the air mass flow sensor 10 and the pressure sensor 11.

In the feedback block 17, which contains the inverse model unit 20, the model executed in the model unit 18 will now run through in the opposite direction, the setpoint values for suction pipe pressure sP and air mass flow sMF being input variables, in order to determine setpoint values for throttle plate position D and valve travel V. The setpoint value for the intake pipe pressure sP is here generated using the method shown schematically in FIG. 2. The setpoint air mass flow originates from an accelerator pedal transducer.

The comparison parameters relating to the cross-section function Q and pressure in front of the throttle plate are also taken into account here. The value for the cross-section function Q is now determined using equation 1, where the setpoint value for the air mass flow sMF is now used instead of the modeled value. The setpoint throttle plate position sD is determined from the value for the cross-section function Q via the characteristic map. This corresponds to the throttle plate model 26 of FIG. 2. In addition, the setpoint value of the valve travel position sV is calculated as explained with reference to FIG. 2. These setpoint values are then set at the internal combustion engine 1.

The invention claimed is:

1. A method for regulating the filling of an internal combustion engine, comprising:
   supplying a combustion air mass flow to a combustion chamber;
   arranging a first and second actuator, that are controlled with respect to their position, in the flow path of the combustion air mass flow, the second actuator being arranged downstream of the first actuator and the first and second actuators having an upper limit position that is open and a lower limit position that is closed;
   detecting an actual rotational speed of the internal combustion engine; and predefining a setpoint intake pipe pressure for controlling the first actuator, wherein as long as the second actuator is not in the lower limit position the setpoint intake pipe pressure is determined by a rotational speed-dependent characteristic map where the setpoint air mass flow is not an input parameter, and if the second actuator has reached the upper limit position for the current setpoint air mass flow, the setpoint intake pipe pressure is limited to an intake pipe pressure minimum value.

2. The method as claimed in claim 1, wherein the upper limit position is open to the maximum and the lower limit position is closed to the maximum.

3. The method as claimed in claim 1, wherein an invertible numeric mass flow model is used for calculating the intake pipe pressure minimum value and the position of the upper limit position of the second actuator and the setpoint air mass flow are input parameters.

4. The method as claimed in claim 1, wherein to control the second actuator an inversion of the numeric mass flow model is used that determines a setpoint position of the second actuator from the setpoint air mass flow and an actual intake pipe pressure.

5. The method as claimed in claim 1, wherein to control the first actuator a model is used that determines a setpoint position of the first actuator from the setpoint air mass flow and the setpoint intake pipe pressure.

6. The method as claimed claim 1, wherein the mass flow model has a monotonic characteristic curve that links the position of the second actuator with the air mass flow and the intake pipe pressure.

7. The method as claimed in claim 1, wherein the first actuator is actuated in order to regulate the setpoint air mass flow when the second actuator is set in the lower limit position.

8. The method as claimed in claim 1, wherein a throttle plate located in an intake tract is used as the first actuator and inlet valves with variable travel adjustment are used as the second actuator.

9. The method as claimed in claim 1, wherein the setpoint air mass flow is derived from a driver request signal.

10. The method as claimed in claim 1, wherein a setpoint intake pipe pressure that is dependent on the setpoint air mass flow is used when the second actuator is sitting in the lower limit position.

11. The method as claimed in claim 10, wherein the setpoint intake pipe pressure is determined using the mass flow model where the position of the second actuator in the lower limit position and the setpoint air mass flow are input parameters.

* * * * *